(12) United States Patent
Malik

(10) Patent No.: US 6,301,349 B1
(45) Date of Patent: Oct. 9, 2001

(54) METHOD AND SYSTEM TO CONNECT AN UNANSWERED FORWARDED COMMUNICATION DIRECTLY TO A VOICE MAIL SERVICE

(75) Inventor: Dale W. Malik, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/090,438

(22) Filed: Jun. 4, 1998

(51) Int. Cl.[7] .................................................. H04M 3/42
(52) U.S. Cl. ........................... 379/211; 379/212; 379/207
(58) Field of Search ................................. 379/88.26, 210, 379/211, 212, 207, 242

(56) References Cited

U.S. PATENT DOCUMENTS

| | | | |
|---|---|---|---|
| 5,355,406 | * 10/1994 | Chencinski et al. | 379/88.27 |
| 5,375,161 | * 12/1994 | Fuller et al. | 455/417 |
| 5,430,719 | 7/1995 | Weisser, Jr. | 370/389 |
| 5,905,789 | * 5/1999 | Will | 379/211 |
| 5,982,858 | * 11/1999 | Carter et al. | 379/88.26 |
| 6,011,834 | * 1/2000 | Jeong | 379/88.26 |
| 6,215,857 | * 4/2001 | Kasiviswanathan | 379/67.1 |

* cited by examiner

Primary Examiner—Fan Tsang
Assistant Examiner—Ovidio Escalante
(74) Attorney, Agent, or Firm—Nora M. Tocups, Esq.; James L. Ewing, IV, Esq.; Kilpatrick Stockton LLP (57) ABSTRACT

Methods and systems in a telecommunications system having a call forwarding service to connect an unanswered forwarded communication directly to a voice mail service of the called party. Upon notice that a communication for a subscriber has gone unanswered at a forwarded location, a call is placed to a code followed by voice mail information. As the call is routed, the code is recognized and the voice mail information is parsed into call instructions including a voice mail directory number as the redirected number. The call is further routed based on the call instructions until a recognition of the designated directory number in the call instructions results in call termination instructions. These instructions direct the serving switch to connect the call to the redirected number which is the voice mail service directory number. Once the call is connected to the voice mail service, the call is transferred to the unanswered forwarded communication so that the caller may leave a message in the voice mail service for the subscriber.

19 Claims, 5 Drawing Sheets

METHOD AND SYSTEM TO CONNECT AN UNANSWERED FORWARDED COMMUNICATION DIRECTLY TO A VOICE MAIL SERVICE

FIELD OF THE INVENTION

The field of the invention relates to telecommunications, and particularly relates to call forwarding services. Even more particularly, the field of the invention relates to the connection of unanswered calls to a voice mail service of a subscriber when the call forwarding service is applied to calls of the subscriber.

BACKGROUND

A particularly popular service offered by many telecommunication service providers is a call forwarding service. A subscriber who has call forwarding service may specify that at certain times all of his or her calls be forwarded to a forwarded location. The subscriber typically may also specify that if a call that is forwarded to the forwarded location goes unanswered, then the call may be routed to a voice mail service (VMS) that is applied to a designated directory number associated with the subscriber. Usually, this designated directory number is the home telephone number of the subscriber, but it may be any other directory number such as the subscriber's office directory number, car phone number, etc.

Even though a call forwarding service is a popular service, a typical call forwarding service does have some drawbacks. One drawback is that a caller may suffer a delay in the connection of his or her call in certain circumstances. One such circumstance relates to the process of a caller being connected to the voice mail service of a called party who has not answered the caller's call that has been forwarded to a forwarded location. In other words, a caller may suffer a delay in the connection of his or her call when the call goes unanswered at the forwarded location and the call has to be routed to the voice mailbox of the called party.

Figure 1:
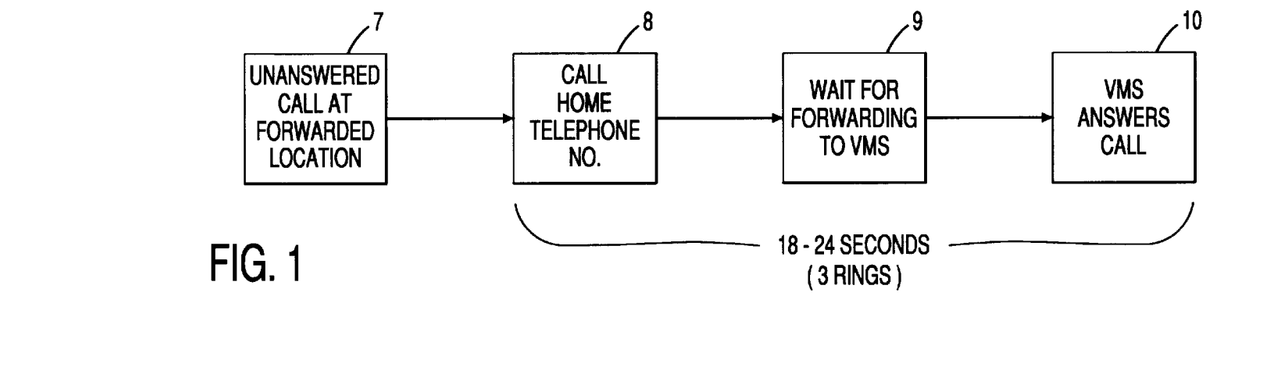
FIG. 1 is a block diagram illustrating an example of a process that causes the delay that a caller may suffer in being connected to a called party's voice mailbox.

FIG. 1 illustrates an example of a process that causes the delay that a caller may suffer in being connected to a called party's voice mail service. For this example, assume that a subscriber to a call forwarding service has directed that all of his or her calls that go unanswered at a forwarded location be sent to the subscriber's voice mail service. Also assume that a caller has called the subscriber, that the call has been forwarded to a forwarded location, and that the call has gone unanswered at the forwarded location (block 7 of FIG. 1.) So, the call forwarding service, taking note of the unanswered call at the forwarded location, calls the home telephone number of the subscriber as shown in block 8, and waits for the call to be forwarded to the subscriber's voice mail service as shown in block 9. Typically, after three or four rings, the voice mail service answers the call, per block 10, and the caller may leave a message for the subscriber in the subscriber's voice mailbox. Connecting the caller to the subscriber's mailbox pursuant to the process shown in FIG. 1 takes about 18–24 seconds (3–4 rings of a telephone). In the greater scheme of things, 18–24 seconds may seem inconsequential. But in the competitive world of telecommunications, 18–24 seconds is a delay that is noticeable to a caller, and generally is not appreciated. Such a noticeable delay to a caller is something service providers wish to avoid.

Figure 2:
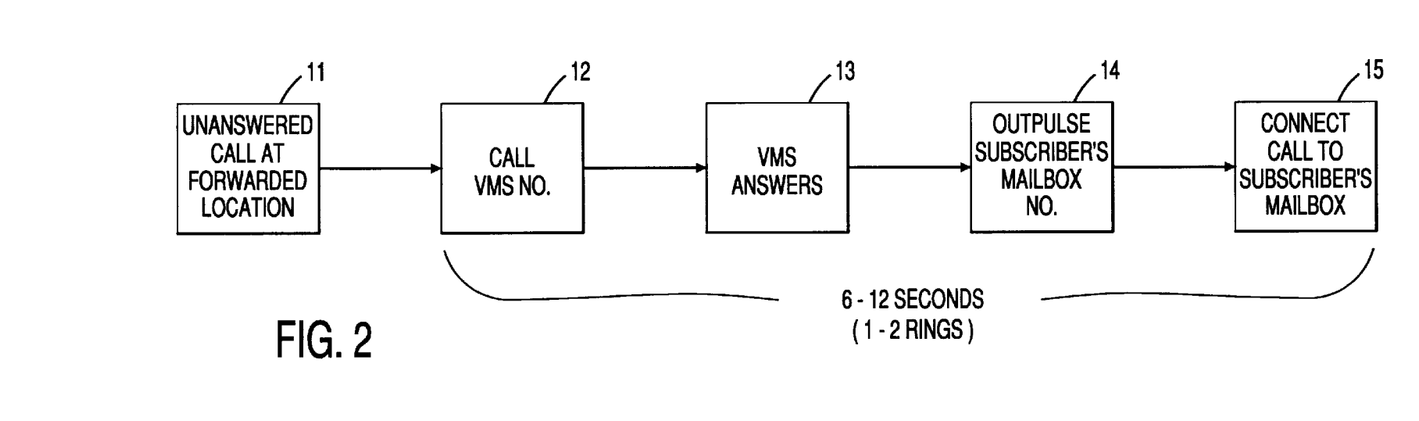
FIG. 2 is a block diagram illustrating another example of a process that causes the delay that a caller may suffer in being connected to a called party's voice mailbox.

FIG. 2 illustrates another example of a process that causes the delay that a caller may suffer in being connected to a called party's voice mail service. As with the previous example, assume that a subscriber to a call forwarding service has directed that all of his or her calls that go unanswered at a forwarded location be sent to the subscriber's voice mail service. Also assume that a caller has called the subscriber, that the call has been forwarded to a forwarded location, and that the call has gone unanswered at the forwarded location (block 11 of FIG. 2.) So, the call forwarding service, taking note of the unanswered call at the forwarded location, calls the telephone number of the voice mail service of the subscriber (block 12). In block 13, the voice mail service answers the call, and as illustrated in block 14, the call forwarding service responds by outpulsing the subscriber's mailbox number. The call then is connected to the subscriber's voice mailbox (block 15). Connecting the caller to the subscriber's voice mailbox pursuant to the process shown in FIG. 2 takes less time than the process illustrated in FIG. 1, but the FIG. 2 process still takes about 6–12 seconds (1–2 rings of a telephone). In other words, after a call has noticeably gone unanswered, the caller is delayed another 6–12 seconds from being able to leave a voice mail message for the subscriber. Even though this FIG. 2 process is quicker than the FIG. 1 process, it still involves a delay in the connection of a call that is noticeable, and often annoying, to a caller. Service providers are interested in eliminating or at least minimizing such annoyances to their customers and subscribers.

Accordingly, there is a need for a process that minimizes the delay suffered by a caller during the process of being connected to the voice mail service of a called party in the circumstance when a call forwarded to a forwarded location goes unanswered.

SUMMARY OF THE INVENTION

In a telecommunications system having a call forwarding service, the present invention includes methods and systems that connect an unanswered forwarded communication directly to a voice mail service of the called party. Advantageously, the present invention avoids the connection of the unanswered forwarded communication to the home telephone number or other designated directory number to which the voice mail service is applied. By avoiding the connection of the unanswered forwarded communication to the home telephone number, the present invention minimizes the delay suffered by the caller during the process of connection. Another advantage of the exemplary embodiments is that the message that is left by a caller pursuant to these embodiments appears as if the message has been left as a result of a call that has rolled over into voice mail from the subscriber's designated directory number having gone unanswered. In other words, the message appears as if the caller had called directly the subscriber's designated directory number and been transferred to voice mail. No record of the caller's call having been forwarded to a forwarded location and gone unanswered at the forwarded location is made apparent to the subscriber.

Generally stated, an exemplary embodiment of the present invention involves an intelligent peripheral such as a service node to enable the process of connecting an unanswered forwarded communication to the voice mail service of a called subscriber. This process begins when the exemplary embodiment recognizes that a communication for a subscriber has gone unanswered at a forwarded location and recognizes that the subscriber has specified that such unanswered forwarded communications are to be routed to the voice mail service applied to the subscriber's designated directory number. For ease of reference, the term "designated directory number" is often used herein synonymously with the term "home telephone number", but the term "designated directory number" should not be so limited and may refer to any other directory number that may be designated by the subscriber and to which the subscriber's voice mail service is applied.

The exemplary embodiment proceeds by placing a call by dialing a code such as a feature access code. The code is followed by voice mail information so that the call is routed with the voice mail information through the telecommunications system. In the exemplary embodiment, the voice mail information includes the designated directory number of the subscriber to which the voice mail service is applied and the voice mail service (VMS) directory number of the VMS applied to the designated directory number.

In routing the call through the telecommunications system, a recognition is made of the code. For example, if a feature access code is dialed, then this code is recognized at a service switching point (SSP) which engages in a query/response exchange with another network element such as a service control point (SCP) with respect to further processing of the call. In response to the recognition of the feature access code, the voice mail information, which had followed the feature access code, is parsed into call instructions. Such recognition of the feature access code and the parsing may take place at the SCP. The SCP may be part of the system that enables connection of an unanswered forwarded communication directly to a voice mail service applied to a designated directory number of the subscriber without connecting the unanswered forwarded communication to the designated directory number.

The call instructions generally include a called party number and a redirected number. The voice mail information may be parsed into the call instructions by including the designated directory number as the called party number and by including the VMS directory number as the redirected number. Once the voice mail information is parsed into the call instructions, the call is further routed with the call instructions and based on the call instructions through the telecommunications system. Generally, the call is routed based on the designated directory number such as the home telephone number to which the voice mail service of the subscriber is applied.

In further routing the call through the telecommunications system, the processing of the call is paused so as to obtain call termination instructions. Typically, such a pause in the processing of the call takes place based upon the recognition by the terminating service switching point (SSP) that a call that is directed to the particular designated directory number requires the SSP to obtain instructions from another network element such as an SCP. This recognition results generally in a query/response exchange between the SSP and the other network element. In this exemplary embodiment, the query from the SSP may include an identification of the network element from which the call originated in the field otherwise used for billing party number information associated with the call. In other words, the query from the SSP may include an identification of the intelligent peripheral such as the service node as the billing party number in the billing party field that is included in the query. This identification is recognized by the SCP, which, based thereon, provides call termination instructions in a response to the SSP.

The call termination instructions direct the call to be terminated to the VMS applied to the designated directory number of the subscriber. In particular, the call termination instructions include directions that the call be terminated to the redirected number, which is the VMS directory number.

In response to receipt of the call termination instructions, the call is terminated to the VMS applied to the designated directory number of the subscriber. The call termination instructions also may include a directive that the redirected number be changed to the designated directory number. In which case, the call is terminated to the VMS of the subscriber by terminating the call to the VMS directory number and changing the redirected number to the designated directory number.

After the call is terminated to the VMS, the unanswered forwarded communication is bridged to the call. For example, in the exemplary embodiment, the service node bridges the unanswered forwarded communication to the call to the subscriber's VMS, and the service node then drops out of the call path.

Advantageously, the placement and routing of the call through the telecommunications system on the basis of the call instructions until the call termination instructions are received allows the call to be terminated to the VMS rather than to the home telephone number so that the unanswered forwarded communication may be directly connected to the VMS without first being connected to the home telephone number.

Therefore, it is an object of the exemplary embodiments of the present invention to provide methods and systems that minimize the delay suffered by a caller during the process of being connected to the voice mail service of a called party in the circumstance when a call forwarded to a forwarded location goes unanswered.

DETAILED DESCRIPTION

Generally stated, the present invention may be used in a telecommunications system having a call forwarding service so that communications that go unanswered at a forwarded location may be connected to the voice mail service of a subscriber in as expeditious a manner as possible. The exemplary embodiments described below illustrate that an unanswered forwarded communication is connected directly to the voice mail service of the called party without being first being connected to the home telephone, number or other designated directory number to which the voice mail service applied. The exemplary embodiments avoid the connection of the unanswered forwarded communication to the designated directory number by providing that a call is placed and routed through the telecommunications system such that this call is associated with voice mail information, call instructions and call termination instructions that allow the call to be directly connected with the voice mail service. Once the call is connected with the voice mail service, then the unanswered forwarded communication may be bridged to the call. By this process, the caller experiences a minimum of delay in connection of the communication to the voice mail service of the called subscriber. Also by this process, the message from the caller leaves no record of the call having been forwarded to the forwarded location and having gone unanswered at that forwarded location.

Figure 3:
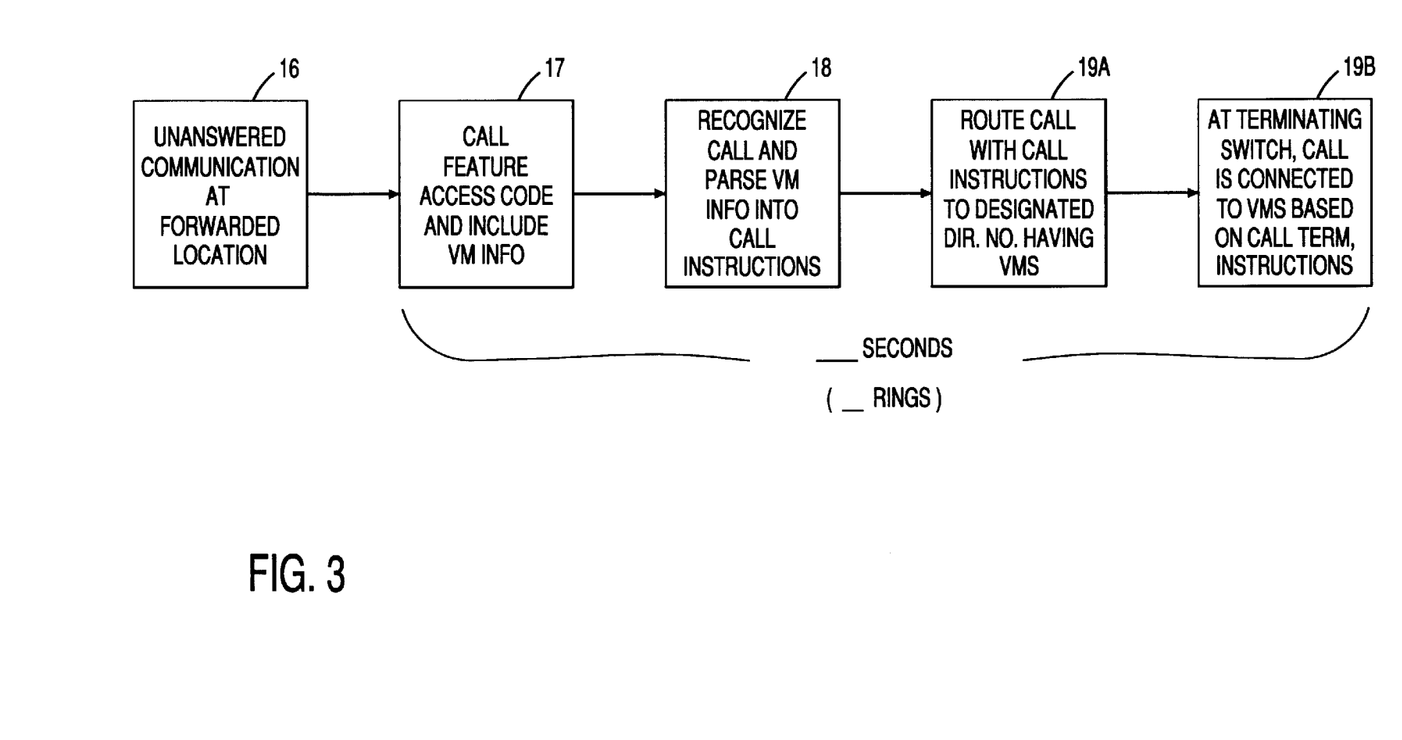
FIG. 3 is a block diagram illustrating an overview of the process of an exemplary embodiment of the present invention.

The detailed description of the exemplary embodiments begins with an overview of an exemplary process that refers to the block diagram of FIG. 3. After this overview, an exemplary environment in which exemplary embodiments of the present invention may be used is presented with reference to FIG. 4. Additional details regarding the exemplary processes are presented in connection with the flow diagram of FIG. 5 and the block and timing diagram of FIG. 6. The reader is reminded that like reference numerals refer to like elements throughout the drawings.

Overview of the Process of An Exemplary Embodiment—FIG. 3

In the overview of an exemplary embodiment of the present invention, assume that a subscriber of a call forwarding service has directed that all of his or her communications that go unanswered at a forwarded location are to be sent to the subscriber's voice mailbox of a voice mail service (VMS). As illustrated in block 16 of FIG. 3, assume that a communication for the subscriber has gone unanswered at a forwarded location. The call forwarding service takes note of the communication having gone unanswered and of the subscriber's desire that his or her unanswered communications be directed to his or her voice mailbox. So, as shown in block 17, the call forwarding service makes a call by dialing a feature access code. The feature access code is followed by outpulsed digits that correspond to voice mail information relating to the subscriber. Preferably, the voice mail information includes a directory number designated by the subscriber and to which the voice mail service is applied. The voice mail information also includes a directory number for the voice mail service, and possibly includes a voice mailbox number for the subscriber. In addition, the voice mail information may include the calling number of the caller. As a result of the call to the feature access code, the call is routed through the telecommunications system on the basis of the code.

As shown in block 18 of FIG. 3, as the call is routed through the telecommunications system, the call to the feature access code is recognized. On the basis of the recognition, the voice mail information is parsed into call instructions such as may typically accompany a call as the call is routed through the telecommunications system. Per block 19A, the call is routed with and on the basis of the call instructions, particularly, on the basis of the designated directory number, to the terminating service switching point (SSP) (also referred to herein as terminating switch) serving the designated directory number. At this SSP, as illustrated in block 19B, based on the call instructions, the call is connected to the voice mail service that is applied to the designated directory number rather than to the designated directory number. Once this call is connected to the voice mail service, the call is bridged to the caller's communication so that the caller may leave a voice mail message for the called party in his or her voice mailbox.

Advantageously, the exemplary method described in connection with FIG. 3, after the call has gone unanswered at a forwarded location, directly connects the caller to the voice mail service of the subscriber. By this exemplary method, the delay the caller experiences during the process of being connected to the voice mail service is minimized. The delay is minimized because the call forwarding service does not have to place a call to the subscriber's designated directory number and wait for the call to rollover to the voice mail service.

Another advantage of the exemplary method is that the call forwarding service does not have to place a call directly to the subscriber's voice mail service, but rather may take advantage of the voice mail service being applied to the subscriber's designated directory number.

A particular advantage of the exemplary method described in connection with FIG. 3 is that connecting the caller to the subscriber's mailbox takes only the required amount of time for the voice mail service to answer.

Figure 4:
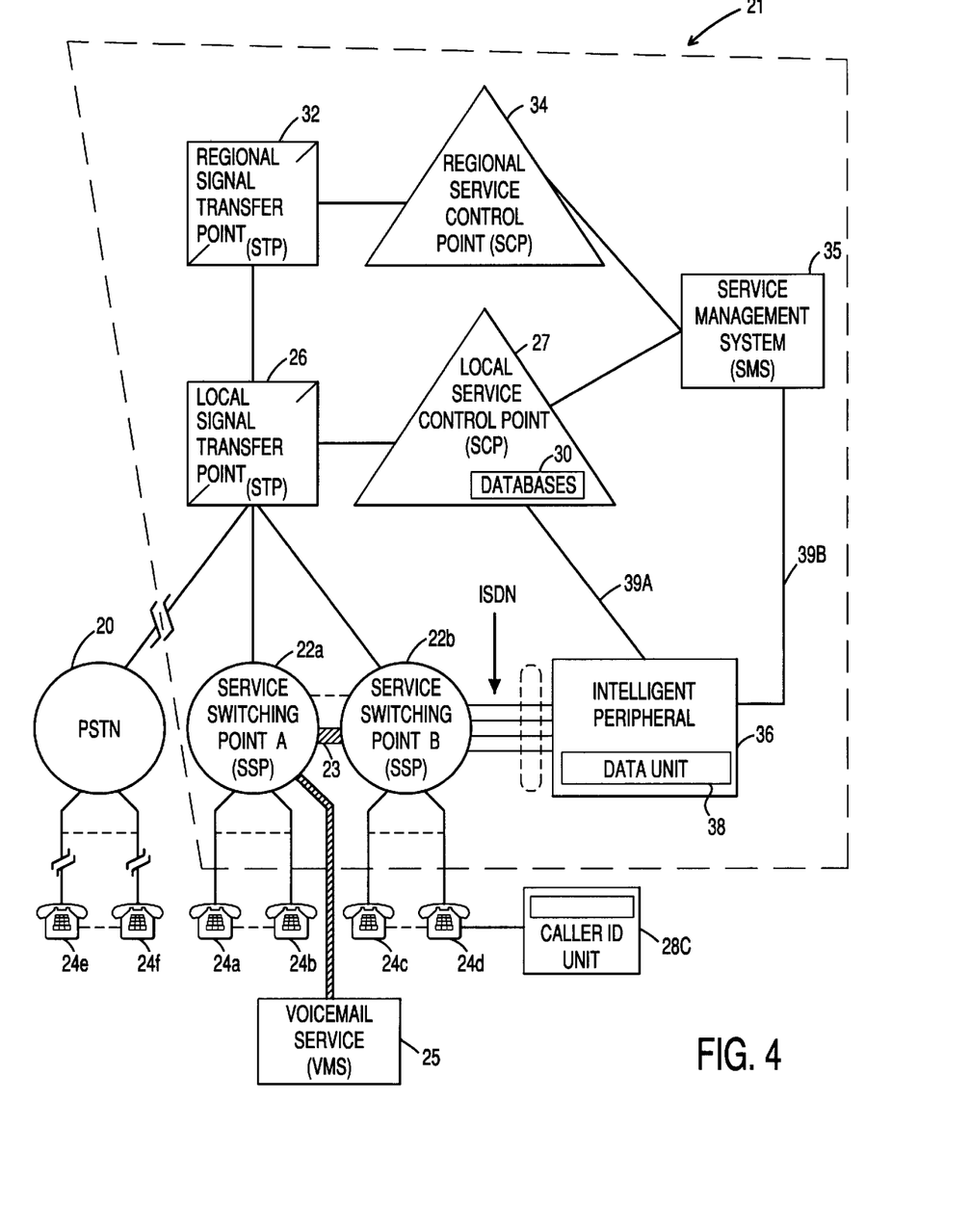
FIG. 4 is a block diagram of an exemplary environment in which an exemplary embodiment of the present invention may be used.

Overview of an Exemplary Environment—FIG. 4

FIG. 4 is a diagram of an exemplary environment for operation of the methods and systems of the present invention. Connected to the public switched telecommunication network (PSTN) 20 as an exemplary environment is an Advanced Intelligent Network (AIN) 21. For brevity, only a basic explanation of the AIN 21 is provided herein. Where the AIN 21 operates or is composed differently in an important aspect from that which would be understood by those skilled in the art, additional details are provided herein. For further information regarding the referenced AIN 21 and aspects thereof, the interested reader is referred to the commonly-assigned patent to Weisser, U.S. Pat. No. 5,430,719, which is incorporated herein by reference.

The AIN 21 includes a variety of interconnected network elements. A group of such network elements includes the plurality of central offices which are indicated as service switching points (SSPs) 22a, 22b in FIG. 4. An SSP may be referred to herein as a switch. An SSP typically includes switch functionality, but also includes other functionality so as to communicate with other AIN elements as those skilled in the art will understand. SSP 22a is illustrated as connected by trunk line 23 to SSP 22b. As further illustrated in FIG. 4, the SSPs 22a, 22b have a plurality of subscriber lines connected thereto. A subscriber line may also be referred to as a calling line. Each SSP serves a designated group of calling lines, and thus, the SSP that serves a particular calling line may be referred to as its serving SSP. Each calling line is connected typically to a piece of terminating equipment including a plurality of telephones commonly referenced as 24 and individually referenced as 24a, 24b, 24c, 24d and 24e. Although telephones are illustrated as the pieces of terminating equipment in the drawings, those skilled in the art will understand that such pieces include other devices such as facsimile machines, computers, modems, answering machines, etc. In addition, a caller identification (ID) unit 28c is illustrated as connected to telephone 24d. Alternatively, the terminating equipment may have data receipt capability such as an analog display service interface (ADSI) compatible telephone, or a computer functionally connected to the telephone.

FIG. 4 also illustrates that a voice mail service (VMS) 25 is provided at or otherwise connected by a trunk line to SSP A 22a. Generally, a voice mail service is a service to record, store, retrieve and perform other functions related to voice messages that may be left by callers for a particular subscriber to the service. A voice mail service applied to a subscriber's calling line is different from an answering machine that may be used by the subscriber in connection with telephone equipment in that a voice mail service as used herein is typically implemented at a service switching point (SSP) or switch rather than at the subscriber's location. By being implemented at or connected to an SSP or switch, the voice mail service is connected to the PSTN 20 so that the voice mail service may serve more than one subscriber or calling line. Even though a voice mail service may be implemented at or connected to a particular SSP or switch, the voice mail service usually serves subscriber's whose calling lines are served by other SSPs or switches than the SSP or switch through or to which the voice mail service is connected. For example, referring to FIG. 4, the voice mail service 25 is illustrated as connected to SSP A 22a and may serve subscriber's associated with telephones 24a and 24b. Nonetheless, the voice mail service 25 also may serve the subscribers associated with telephones 24c and 24d.

By way of further explanation, a voice mail service typically includes a voice mailbox for each subscriber or calling line so that a subscriber may call the service and then access his or her voice mailbox to obtain his or her messages. A typical voice mail service is the BellSouth MemoryCall Voice Mail Service offered by BellSouth Corporation, Atlanta Georgia.

Pursuant to the preferred embodiment, each active calling line in an AIN is assigned a ten digit calling line number. A calling line number is commonly referred to as a telephone number or a directory number. In the description of the present invention, the term "calling line number" is used in its generally understood meaning to be the number which is associated with the calling line on which the call originates. The term "calling line number" is used synonymously, unless indicated, with the following terms: calling party address, calling number or calling party number. Sometimes the term "calling line number" is abbreviated as "calling line". The term "dialed calling line number" is used in its generally understood meaning to be the number which is dialed or input by a caller or source to reach a piece of terminating equipment on a calling line associated with the dialed calling line number. The term "dialed calling line number" is used synonymously, unless indicated, with the following terms: called line number, called party address, called number or called party number.

Referring again to FIG. 4, SSPs 22a, 22b are interconnected by a plurality of trunk circuits 23. These are the voice path trunks that interconnect the SSPs to connect communications. The terms "communication" or "call" are used synonymously herein to include all messages that may be exchanged between caller and called party in the network illustrated in FIG. 4.

Each of the SSPs 22a, 22b is connected to another type of AIN element referred to as a local signal transfer point (STP) 26 via respective data links. Currently, these are data links employing a signaling protocol referred to as Signaling System 7 (SS7), which is well known to those skilled in the art. Much of the intelligence of the AIN resides in yet another type of AIN element referred to as a local service control point (SCP) 27 that is connected to STP 26 over an SS7 data link. Among the functions performed by the SCP 27 is the maintenance of network databases and subscriber databases as represented collectively by databases 30. These databases may be used in providing advanced services to a customer. Typically, the SCP 27 is also the repository of service package applications (SPAs) that are used in connection with or as part of the databases 30 in the application of advanced services, other services or enhanced features to calling lines. As used herein, the phrase "advanced services" refers to features or enhancements that are provided by a telecommunications service provider to a customer in addition to conventional telephone service through the PSTN.

Referring again to FIG. 4, the local STP 26 may be connected to other network elements through a regional STP 32, which in turn, may be connected to a regional SCP 34. Both regional SCP 34 and local SCP 27 are connected via respective data links to a service management system (SMS) 35. The SMS 35 interfaces to business offices of the local exchange carrier and interexchange carriers.

In order to keep the processing of data and calls as simple as possible, a relatively small set of triggers is defined at the SSPs. A trigger in the AIN is an event associated with a particular calling line that generates a query to be sent to an SCP. The trigger causes the SCP to make an inquiry of its databases or service package applications (SPAs) for information and/or processing instructions with respect to the particular call. The results are sent back to the SSP in a response from the SCP 27 through STP 26. The response includes information and/or instructions to the SSP as to how to process the call. The instructions may be to take some special action as a result of an advanced service or enhanced feature. In response, the SSP moves through its call states, collects the called digits, and generates further packets that are used to set up and route the call. Similar devices for routing calls among various local exchange carriers are provided by regional STP 32 and regional SCP 34.

As illustrated in FIG. 4, the AIN 21 also includes an intelligent peripheral (IP) such as a service circuit node 36 (SCN) or a service node (SN). IP 36 typically includes voice and dual tone multifrequency (DTMF) signal recognition devices and voice synthesis devices. In the preferred embodiment, IP 36 also includes a data unit 38 that may function as an interface in the implementation of exemplary embodiments of the present invention as is described in greater detail in connection with the figures below. IP 36 may be connected to the local SCP 27 via data link 39A using an X.25 protocol and to the SMS 35 via a data link 39B. In addition, IP 36 typically is connected to one or more (but usually only a few) SSPs via Integrated Service Digital Network (ISDN) links as shown by the connection to SSP 22b.

Figure 5:
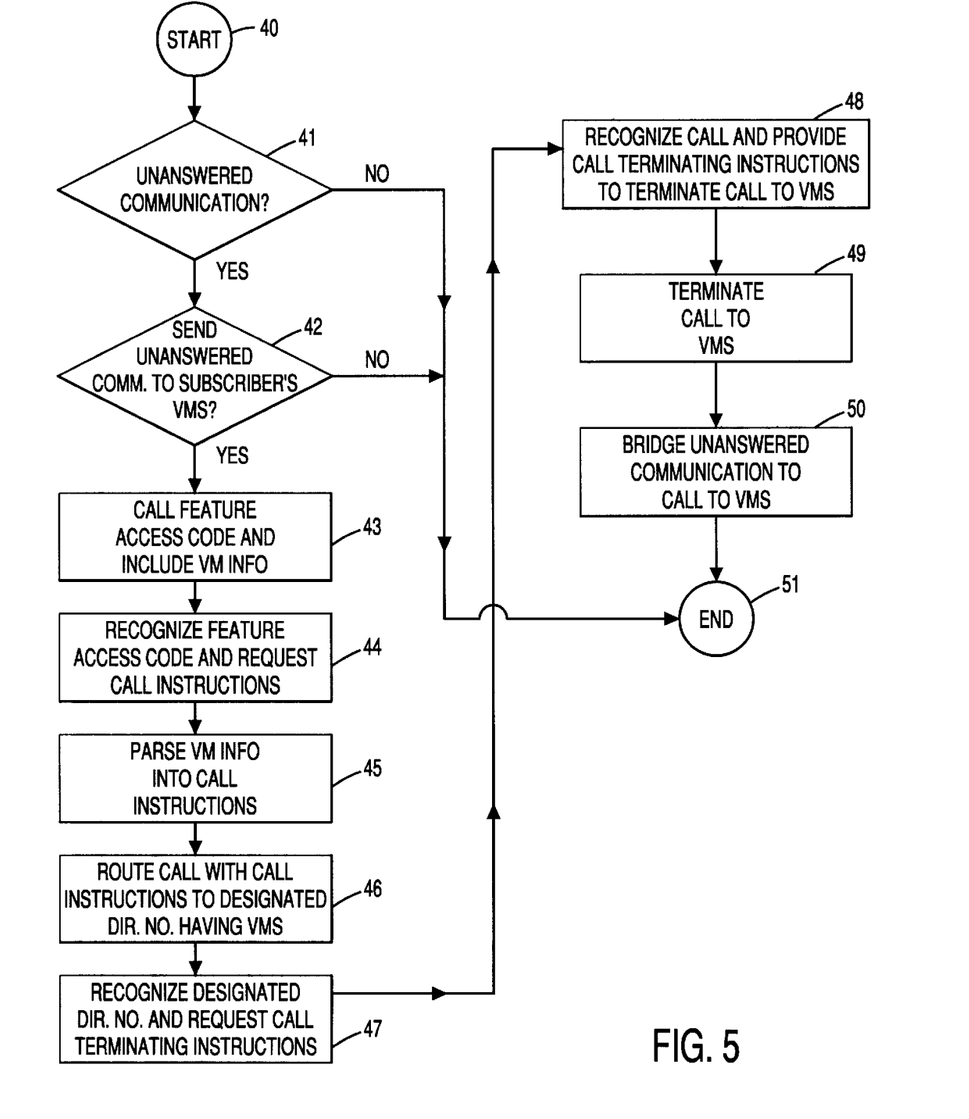
FIG. 5 is a flow diagram of the process of the exemplary embodiment described in the overview of FIG. 3.

Flow Diagram of an Exemplary Process—FIG. 5

FIG. 5 is a flow diagram of the process of the exemplary embodiment described in the overview of FIG. 3. For this exemplary process, assume that a telecommunications system provides a call forwarding service to a subscriber. With this call forwarding service, the subscriber may receive a call that is dialed to a designated directory number such as the subscriber's home telephone number at a forwarded location such as a subscriber's car phone.

The term "forwarded location" is used herein to refer to the calling line, directory number or terminating equipment to which a call that is dialed to the subscriber's designated directory number is routed or forwarded. For example, as noted, a subscriber may specify that all calls to his or her home telephone number be forwarded to his or her office telephone number during business hours. In this example, the office telephone number may be considered the forwarded location. As another example, consider a subscriber who subscribes to an advanced call forwarding service that routes a call to a subscriber to one or more directory numbers until the call is answered or until the call is considered unanswered and then routed to a default destination such as a voice mail service of the subscriber. BellSouth Corporation, Atlanta, Georgia offers such an advanced call forwarding service and refers to that service as Flexible Call Forwarding. In this second example, any of the directory numbers (other than the dialed directory number or the voice mail directory number) to which the call is routed may be considered to be the forwarded location.

Referring again to FIG. 5, the exemplary process begins with start step 40, and in decision step 41 a determination is made as to whether a communication has gone unanswered at a forwarded location. If not, then the process ends in step 51. For example, the communication may have been answered at the forwarded location, and in such case, the exemplary process does not come into play. Alternatively, the communication has gone unanswered at a forwarded location. A communication may go unanswered at a forwarded location in a number of different ways. For example, the communication may be routed to a forwarded location where the calling line is busy. As another example, the communication may be routed to a forwarded location, where after a predetermined amount of time or rings, the communication is not connected to the terminating equipment associated with that forwarded location. Any failure to reach the forwarded location would be considered an unanswered call.

If the communication has gone unanswered at the forwarded location, then in decision step 42 a determination is made as to whether the unanswered forwarded communication is to be sent to the subscriber's voice mail service.

If the determination is negative in that the unanswered forwarded communication is not to be sent to the subscriber's voice mail service, then the process ends in step 51.

Alternatively, if the determination is positive in that the communication is to be sent to the subscriber's voice mail service, then in step 43 a call is placed by dialing a code, such as a feature access code. The purpose of placing the call by dialing a code is so that the network element (such as a switch) that receives the call is alerted to the fact that the call is a special call and that the call requires the network element to proceed with certain steps. The network element that receives a call to a code such a feature access code is provisioned with instructions as to how to react and what steps to take in response to receiving such a call dialed to a code.

Still referring to step 43 and placing the call dialed to the code, after the feature access code is dialed, the feature access code is followed by outpulsed digits that correspond to voice mail information relating to the subscriber. Preferably, the voice mail information includes a directory number designated by the subscriber and to which the voice mail service is applied. The voice mail information also includes a directory number for the voice mail service. This voice mail information may have been obtained in various ways. For example, the directory number designated by the subscriber typically is the directory dialed by the caller. Alternatively, the directory number designated by the subscriber may be obtained from a database, data unit, interface or other element used in connection with the implementation of the exemplary process for the reposit of information relating to subscriber's to the call forwarding service. The voice mail service (VMS) directory number and the voice mailbox number may be obtained from the same element as the designated directory number or from some similar other element. In addition to the designated directory number and the VMS directory number, the voice mail information may include the calling number of the caller and other information or data as necessary to connect the call to the voice mail service of the subscriber.

As a result of the call to the feature access code, the call is routed through the telecommunications system on the basis of the code. This routing of the call may be accompanied with the conventional identification information that is associated with a call as it is routed through a telecommunications system, and in particular, through the Advanced Intelligent Network (AIN). For example, the call dialed to the code may be accompanied with identification information that includes the originating point code (OPC) of the call such as an indicator corresponding to an intelligent peripheral including a service node.

As shown in step 44 of FIG. 5, as the call is routed through the telecommunications system, the call to the feature access code is recognized. As noted above, the network element that receives the call dialed to the code is provisioned to recognize such a code and to take certain steps upon receipt of the code. On the basis of the recognition, in step 45 the voice mail information is parsed into call instructions that typically accompany a call as the call is routed through the telecommunications system. In particular, the voice mail information is parsed into the call instructions by including the designated directory number as the called party number in the call instructions and by including the VMS directory number as the redirected number in the call instructions. In this manner, the communication is further routed with the call instructions and based on the designated directory number through the telecommunications system.

Per step 46 of FIG. 5, the call is routed with and on the basis of the call instructions, particularly, on the basis of the designated directory number, to the terminating service switching point (SSP) (also referred to herein as terminating switch) serving the designated directory number. At this SSP, as illustrated in step 47, based on the call instructions, the call is recognized as directed to a directory number which requires the SSP to request instructions or information with respect to the call from another network element such as an SCP. Typically, the terminating SSP provides the call instructions in its request to the other network element.

In step 48 of FIG. 5, the network element recognizes that the call is to be connected to the voice mail service applied to the directory number rather than to the directory number. This recognition may be made from the call instructions in a number of ways such as recognizing that the call originated from a particular network or telecommunications element, or by a special number being present in the redirected party field. Once it is recognized that the call is to be connected to the voice mail service, such information is provided as call termination instructions to the terminating SSP. The call termination instructions include information in certain fields that may be copied from the call instructions such as the redirected number field. In particular, the call termination instructions may include directions that the call be terminated to the redirected number of the call instructions, which is the VMS directory number. With these call termination instructions, the call is terminated to the VMS directory number without connecting the unanswered forwarded communication to the designated directory number.

In step 49 of FIG. 5, based on the call termination instructions, the terminating SSP connects the call to the voice mail service by terminating the call to the redirected number which is the VMS directory number. As a result of the call termination instructions, the terminating SSP then notes the designated directory number as the last redirected party. There is an advantage presented by this change of the redirected number. When the SMDI link that delivers inbound call information to the VMS is set to select the last redirected number, it will transmit the designated directory number as the mailbox identifier. Otherwise the switch will send the first redirecting party information as the mailbox identifier (the VMS telephone number). The subscriber's voice mail appears as if the caller had called the designated directory number and that the call then had rolled over to the voice mail service. There is no record in the subscriber's voice mail service that the call originated from any other network element such as an intelligent peripheral. Advantageously, the subscriber in reviewing his or her voice mail message recognizes the message as from a caller placing a call to the subscriber's directory number, rather than the message having a mysterious origin with some network element.

In step 50 of FIG. 5, the unanswered forwarded communication is bridged to the call to the voice mail service so that the caller may leave a message for the subscriber. The process ends in step 51.

Figure 6:
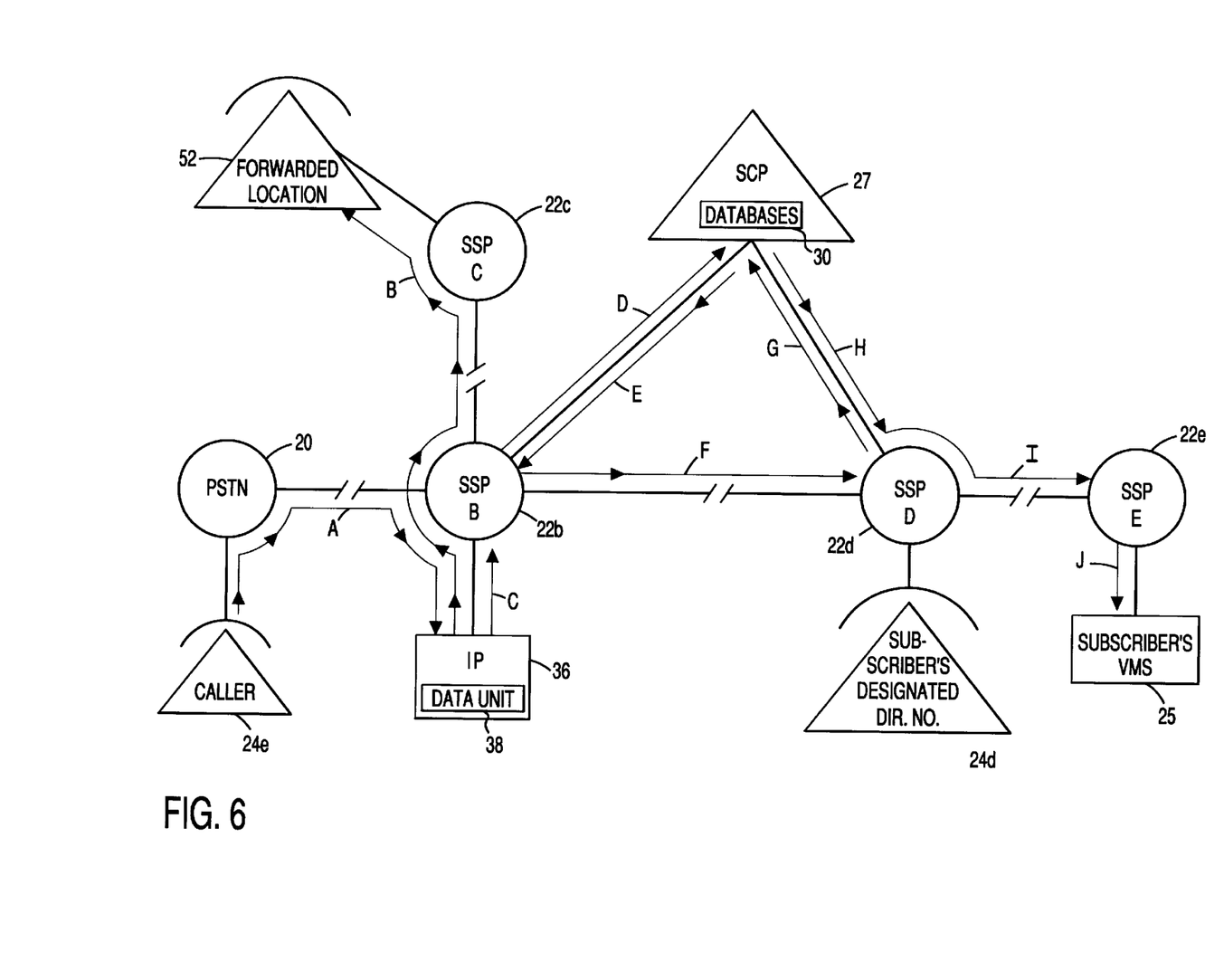
FIG. 6 is a block and timing diagram illustrating the process of the exemplary embodiment of FIGS. 3 and 6 in the exemplary environment of FIG. 4.

Operation of an Exemplary Embodiment in an AIN Environment—FIG. 6

The present invention includes an exemplary system and method that may be used in connection with the exemplary Advanced Intelligent Network (AIN) environment discussed above in connection with FIG. 4. As with the other exemplary embodiments, this embodiment connects an unanswered forwarded communication directly to the voice mail service of a subscriber without connecting the communication to the designated directory number of the subscriber.

For example, referring to FIG. 6, as illustrated by arrow A, a caller 24e places a call or communication to a subscriber. Pursuant to the call forwarding service to which the subscriber subscribes, this communication is routed from the caller 24e through the PSTN 20 via SSP B 22b until the communication reaches the intelligent peripheral (IP) 36 that is used in the implementation of the call forwarding service. The IP 36 has information that may be contained in or accessed through a data unit 38 or some other interface that all communications directed to the subscriber's directory number are to be forwarded to a forwarded location 52. So, as illustrated by arrow B, the IP 36 forwards the communication from caller 24e through the telecommunications system via SSP C 22c to the forwarded location 52.

The IP 36 monitors this forwarded communication and notes that it has gone unanswered at the forwarded location. The IP 36 also notes that this subscriber has specified that communications that go unanswered at a forwarded location are to be routed to the subscriber's voice mail service. The subscriber's specifications and other information related to the subscriber such as voice mail information may be stored and obtained from the data unit 38 associated with the IP 36. The data unit 38 may be a software program and data storage unit designed for assembling blocks of information or data. The data unit 38 assembles the information relating to the communication from the caller 24e. The data unit 38 also stores and provides the records related to the subscriber. Based on the unanswered status of the communication and the subscriber's specifications, the IP 36 obtains voice mail information relating to the subscriber and relating to the communication from the caller 24e. Preferably, this voice mail information includes the directory number designated by the subscriber and to which a voice mail service is applied, and a voice mail service (VMS) directory number. This voice mail information may include other information such as the voice mailbox number of the subscriber and the calling line number of the caller 24e.

After the IP 36 obtains the voice mail information, as illustrated by arrow C in FIG. 6 the IP 36 places a call to a code, and in particular, places a call by dialing a feature access code. This feature access code call is a call that is recognized via a customized dialing plan (CDP) trigger by a service switching point (SSP) or other network element as a call that requires instructions from another source such as a network element like a service control point (SCP). The instructions pertain to further processing of the feature access code call. For example, a feature access code call may be a call that is dialed or otherwise transmitted using digits such as *61 followed by a free form string of up to thirty subsequent digits. Per this exemplary embodiment, after the IP 36 transmits the feature access code for the feature access code call, the IP 36 associates voice mail information with the feature access code call by dialing up to thirty digits that represent the voice mail information. For example, the IP may transmit a feature access code call including the voice mail information by the following string of outpulsed digits: *61XXXXXXXXXXXXXXXXXXXXXXXXXXXXXX. Typically, these subsequent digits of the voice mail information may represent: (1) the ten digits of a called number such as the directory number to which a voice mail service is applied; (2) the ten digits of the VMS directory number and/or (3) the ten digits of the calling party number. The feature access code and the string of digits representing the voice mail information may be provided or used by the IP 36 through the data unit 38. In the exemplary embodiment, the call is made on an ISDN line to facilitate quick transmission of the data as a call set up message on the D-channel, rather than entering touch tones, which would take several seconds on an analog line.

Additional information regarding the processing of a call placed by an intelligent peripheral to a feature access code followed by information such as the up to thirty outpulsed digits is provided in the commonly assigned patent application entitled SYSTEM AND METHOD FOR MANIPULATING DATA FIELDS IN A CALL STRUCTURE FOR SYNCHRONIZING BILLING INFORMATION AND RETAINING ORIGINAL CALLING PARTY INFORMATION, Ser. No. 08/909,417, filed with the United States Patent and Trademark Office on Aug. 11, 1997, and incorporated herein by reference.

As indicated by arrow C of FIG. 6, the feature access code call is transmitted into the telecommunications system and is routed in a conventional manner to service switching point B (SSP B) 22b. Based on the feature access code, SSP B 22b pauses in the processing of the feature access code call to obtain instructions with respect to further processing of the feature access code call. Preferably, the SSP B 22b obtains the instructions through a query/response exchange with service control point (SCP) 26. As indicated by arrow D, SSP B 22b launches a query to SCP 27. The query includes the feature access code and the voice mail information. In particular, the query includes the up to thirty digits of the voice mail information. The query may include other information relating to the feature access code call as well.

Upon receipt of the query from SSP B 22b, the SCP 27 (or appropriate service package application (SPA)) is predisposed to recognize the feature access code as an indication that the communication is to be routed to the voice mail service associated with a designated directory number of a subscriber rather than to the designated directory number. This predisposition of the SCP 27 may take the form of programming the SCP 27 or appropriate element or SPA thereof to make this recognition. Based on this recognition, the SCP 27 is predisposed to provide call instructions. Preferably, SCP 27 parses the voice mail information into call instructions. Parsing of the voice mail information into call instructions includes assembly of the voice mail information into a response to the query from the SSP B 22b. In particular, in the parsing, the called number (or designated directory number) is included as the called number in the called number field of the response, and the VMS directory number is included in the redirecting party field as the redirected number. In addition, the call instructions may include an identification of the intelligent peripheral (IP) 36 as the originator of the call and this identification may be included in a billing field parameter.

As indicated by arrow E in FIG. 6, the response is transmitted to the SSP B 22b from which the query was received. This response includes the call instructions for further processing of the feature access code call based on the called number field. Upon receipt of the response from the SCP 27, the call instructions are associated with the call by including the call instructions in or associated with identification information that is conventionally transmitted in association with a communication.

As indicated by arrow F of FIG. 6, the call then is routed with the call instructions and based on the designated directory number through the telecommunications system. In the example illustrated in FIG. 6, the call is routed with the identification information including the call instructions from SSP B 22b to SSP D 22d. Based on the direction of the call to the designated directory number, SSP D 22d is predisposed to recognize that instructions with respect to further processing of the communication are to be obtained. For example, this predisposition may include the setting of an AIN trigger with respect to the called number. Preferably, in response to the recognition, the SSP D 22d obtains the instructions through a query/response exchange with an SCP 27. As illustrated in FIG. 6, SSP B 22b and SSP D 22d query the same SCP 27 for information at different points in the exemplary process. Nonetheless, different SCPs may be involved in different points in the exemplary process.

Advantageously, the reaction of the SSP D 22d to receipt of the call to the designated directory number is the query/response exchange that takes place thereafter. Thus, as illustrated by arrow G, SSP D 22d launches a query to SCP 27 for instructions with respect to further processing of the call. The query includes the call instructions by including the identification information associated with the call with the query. In particular, the query includes the call instructions by inclusion of: (1) the designated directory number in the called number field of the query; (2) the VMS directory number in the redirected number field of the query; and (3) an identification of the IP 36 as the originator of the call in the billing party field of the query. In addition, other information may be included in the other fields such as the voice mailbox number of the subscriber.

Upon receipt of the query from SSP D 22d, the SCP 27 is predisposed to recognize that the call relating to the query is to be connected directly to the voice mail service applied to the designated directory number. This recognition may be based on the identification of the IP 36 as the originator of the call in the billing party field of the query. Once it is recognized that the call is to be connected to the voice mail service, such information is provided as call termination instructions to SSP D 22d. The call termination instructions include information in certain fields that may be copied from the call instructions such as the redirected number field. In particular, the call termination instructions may include directions that the call be terminated to the redirected number of the call instructions, which is the VMS directory number. The call termination instructions also may include the directive that the redirected number then be changed to the designated directory number in the call termination instructions.

As illustrated by arrow H of FIG. 6, the SCP 27 provides the call termination instructions to the SSP D 22d in the form of a response to the query which the SCP 27 received from SSP D 22d. The response may include the call termination instructions, the information in the identification information associated with the call, or other data. Based on the call termination instructions, the SSP D 22d is instructed to connect the call to the VMS directory number. In addition, the SSP D 22d is instructed to change the redirected number from the VMS directory number to the designated directory number.

As illustrated by arrow I of FIG. 6, in reaction to the response from the 27, the SSP D 22d does not connect the call to the terminating equipment associated with the subscriber 24d of the designated directory number. Rather, the SSP D 22d connects the call to the VMS directory number. In this example, the VMS service that is applied to the subscriber's designated directory number is implemented through an SSP other than SSP D 22d. In other words, SSP d 22d is not the serving switch for the subscriber's voice mail service. So, SSP D 22d routes the call through the telecommunications system based on the VMS directory number to SSP E 22e. As illustrated by arrow J, SSP E 22e recognizes the VMS directory number associated with the call, and SSP E 22e connects the call through a trunk line to the subscriber's VMS 25. In some cases, additional information such as the subscriber's voice mailbox number is provided to the VMS 25 in connection with the call so that the call may be connected to the appropriate voice mailbox of the VMS 25.

To facilitate the connection of the call to the VMS 25, the SSP E 22e (or whatever SSP is serving the VMS) must have the simplified message desk interface (SMDI) set for the redirecting number (RDN) and not for the originating directory number (ODN). By setting the SMDI to RDN, then the call may be connected to the VMS so that the call appears to the subscriber as if the call had been rolled over to the voice mail service from the subscriber's designated directory number.

Once the call is ringing to the voice mail service 25, the IP 36 receives an indication of this call progress. Upon receipt of this indication, the IP 36 transfers in a conventional manner the unanswered forwarded communication from the caller to the call to the voice mail service 25 so that the caller may leave a message for the subscriber. The process of this exemplary embodiment then effectively ends.

CONCLUSION

In a telecommunications system having a call forwarding service, the present invention includes methods and systems that connect an unanswered forwarded communication directly to a voice mail service of the called party. Advantageously, the present invention avoids the connection of the unanswered forwarded communication to the home telephone number or other designated directory number to which the voice mail service is applied. By avoiding the connection of the unanswered forwarded communication to the home telephone number, the present invention minimizes the delay suffered by the caller during the process of connection. Another advantage of the exemplary embodiments is that the message that is left by a caller pursuant to these embodiments appears as if the message has been left as a result of a call that has rolled over into voice mail from the subscriber's designated directory number having gone unanswered. In other words, the message appears as if the caller had called directly the subscriber's designated directory number and been transferred to voice mail. No record of the caller's call having been forwarded to a forwarded location and gone unanswered at the forwarded location is made apparent to the subscriber.

Alternative embodiments will become apparent to those skilled in the art without departing from the spirit and scope of the present inventions. Accordingly, the scope of the present inventions is defined by the appended claims rather than the foregoing description.

What is claimed is:

1. In a telecommunications system, a method to connect an unanswered forwarded communication directly to a voice mail service (VMS) applied to a designated directory number without connecting the unanswered forwarded communication to the designated directory number, comprising:

placing a call by dialing a code followed by voice mail information so that the call is routed with the voice mail information through the telecommunications system;

in routing the call through the telecommunications system, making a recognition of the code;

in response to the recognition, parsing the voice mail information into call instructions so that the call is further routed with the call instructions and so that the call is further routed based on the call instructions through the telecommunications system;

in further routing the call through the telecommunications system, pausing in processing of the call to obtain call termination instructions based on the call instructions;

receiving the call termination instructions, the call termination instructions directing the call to be terminated to the VMS applied to the designated directory number;

in response to receipt of the call termination instructions, terminating the call to the VMS applied to the designated directory number; and after the call is terminated to the VMS, bridging the unanswered forwarded communication to the call, whereby the further routing of the call through the telecommunications system on the basis of the call instructions until the call termination instructions are received allows the call to be terminated to the VMS rather than to the designated directory number so that the unanswered forwarded communication is directly connected to the VMS without first being connected to the designated directory number.

2. The method of claim 1, wherein the call instructions comprise a called party number and a redirected number; and wherein parsing the voice information comprises, in response to the recognition, parsing the voice mail information into the call instructions by including the designated directory number as the called party number and by including the VMS directory number as the redirected number so that the communication is further routed with the call instructions and based on the designated directory number through the telecommunications system.

3. The method of claim 2, wherein the call termination instructions comprise directions that the call be terminated to the redirected number, the redirected number being the VMS directory number; and wherein terminating the call comprises, in response to receipt of the call termination instructions, terminating the call to the VMS by terminating the call to the VMS directory number.

4. The method of claim 3, wherein the call termination instructions comprise a directive that the redirected number be changed to the designated directory number; and wherein terminating the call comprises terminating the call to the VMS by terminating the call to the VMS directory number and changing the redirected number to the designated directory number.

5. The method of claim 1, wherein the voice mail information comprises the designated directory number, and a voice mail service (VMS) directory number of the VMS applied to the designated directory number; and wherein placing the call comprises placing the call by dialing the code followed by the designated directory number and the VMS directory number so that the call is routed through the telecommunications system on the basis of the code.

6. The method of claim 1, wherein the call instructions comprise the designated directory number of the subscriber; and wherein parsing in the processing of the call comprises, in further routing the call through the telecommunications system, recognizing the designated directory number and pausing in the processing of the call on the basis of the designated directory number to obtain the call termination instructions based on the call instructions.

7. In a telecommunications system, a method to connect an unanswered forwarded communication directly to a voice mail service (VMS) applied to a designated directory number without connecting the unanswered forwarded communication to the designated directory number, comprising:

placing a call so that the call is routed with the designated directory number and a voice mail service (VMS) directory number through the telecommunications system;

in routing the call through the telecommunications system, recognizing the designated directory number and pausing in processing of the call based on the designated directory number in order to obtain call termination instructions;

receiving the call termination instructions, the call termination instructions directing the call to be terminated to the VMS directory number;

in response to receipt of the call termination instructions, terminating the call to the VMS directory number; and after the call is terminated to the VMS directory number, bridging the unanswered forwarded communication to the call, whereby the routing of the call through the telecommunications system until the call termination instructions are received allows the call to be terminated to the VMS directory number rather than to the designated directory number so that the unanswered forwarded communication may be directly connected to the VMS without first being connected to the designated directory number.

8. The method of claim 7, wherein the designated directory number corresponds to a called party number, and wherein the VMS directory number corresponds to a redirected number;

wherein the call termination instructions comprise directives that the call be terminated to the redirected number and a directive that the redirected number be changed to the designated directory number; and wherein terminating the call comprises, in response to receipt of the call termination instructions, terminating the call to the VMS directory number as the redirected number and changing the redirected number to the designated directory number.

9. In a telecommunications system having a call forwarding service applied to calls for a subscriber, a system to enable connection of an unanswered forwarded communication directly to a voice mail service (VMS) applied to a designated directory number of the subscriber without connecting the unanswered forwarded communication to the designated directory number, comprising:

an intelligent peripheral operative to:
make a first recognition that a communication has gone unanswered, the communication being for the subscriber and to which the call forwarding service has been applied so that the communication has been forwarded to a forwarded location where the communication has gone unanswered;
make a second recognition that the communication is to be connected to the VMS applied to the designated directory number of the subscriber;
on the basis of the first recognition and the second recognition, place a call by dialing a code followed by voice mail information so that the call is routed through the telecommunications system and terminated to the VMS applied to the designated directory number of the subscriber; and
after the call has been terminated to the VMS, bridge the communication to the call,
whereby the intelligent peripheral enables, through the use of the call dialed to the code and further routed through the telecommunications system, the communication to be directly connected to the VMS without first being connected to the designated directory number.

10. The system of claim 9, wherein the voice mail information comprises the designated directory number of the subscriber, and a voice mail service (VMS) directory number of the VMS applied to the designated directory number; and wherein the intelligent peripheral is operative to place the call by dialing the code followed by the designated directory number of the subscriber and the VMS directory number so that the call is routed through the telecommunications system on the basis of the code, then later on the basis of the designated directory number and terminated to the VMS directory number.

11. In a telecommunications system having a call forwarding service applied to calls for a subscriber, a system to enable connection of an unanswered forwarded communication directly to a voice mail service (VMS) applied to a designated directory number of the subscriber without connecting the unanswered forwarded communication to the designated directory number, comprising:

a service control point operative to:
receive a first query relating to a call, the call having been placed by dialing a code followed by voice mail information, and the query having been generated on the basis of the code;
recognize the code;
in response to recognizing the code, parse the voice mail information into call instructions;
provide the call instructions in a first response corresponding to the first query so that the call is further routed with and based on the call instructions through the telecommunications system;
receive a second query relating to the call, the second query including an identification of a network element as a billing party number associated with the call; and
in response to the identification, provide call termination instructions in a second response corresponding to the second query so that the call is terminated to a voice mail service applied to a designated directory number of the subscriber without connecting the unanswered forwarded communication to the designated directory number.

12. The system of claim 11, wherein the voice mail information comprises the designated directory number of the subscriber, and a voice mail service (VMS) directory number of the VMS applied to the designated directory number, and wherein the call instructions comprise a called party number and a redirected number; and
wherein the service control point is operative, in response to the recognition of the code, to parse the voice mail information into the call instructions by including the designated directory number as the called party number and by including the VMS directory number as the redirected number so that the communication is further routed with the call instructions and based on the designated directory number through the telecommunications system.

13. The system of claim 12, wherein the call termination instructions comprise directions that the call be terminated to the redirected number, the redirected number being the VMS directory number so that the call is terminated to the VMS directory number without connecting the unanswered forwarded communication to the designated directory number.

14. The system of claim 12, wherein the call termination instructions comprise directions that the call be terminated to the redirected number and a directive that the redirected number be changed to the designated directory number so that the call is terminated to the VMS directory number without connecting the unanswered forwarded communication to the designated directory number and the redirected number is changed to the designated directory number.

15. A method to connect an unanswered forwarded communication to a voice mail service (VMS) applied to a designated directory number, comprising:

routing a call including the designated directory number and a VMS directory number;
parsing the designated directory number as a called party number and the VMS directory number as a redirected number;
receiving a directive that the call be terminated to the redirected number, and that the redirected number then be changed to the designated directory number;
with the redirected number being the VMS directory number, terminating the call to the VMS directory number and then changing the redirected number to the designated directory number; and
after the call is terminated to the VMS, bridging the unanswered forwarded communication to the call.

16. A method to connect an unanswered forwarded communication to a voice mail service (VMS) applied to a designated directory number, comprising:

placing a call so that the call is routed to include a designated directory number and a VMS number, wherein the designated directory number corresponds to a called party number, and wherein the VMS directory number corresponds to a redirected number;

receiving call termination instructions based on the designated directory number, wherein the call termination instructions comprise a directive that the call be terminated to the redirected number and a directive that the redirected number be changed to the designated directory number;

in response to receipt of the call termination instructions, terminating the call to the VMS directory number as the redirected number and changing the redirected number to the designated directory number; and after the call is terminated to the VMS directory number, bridging the unanswered forwarded communication to the call.

17. A system to enable connection of an unanswered forwarded communication directly to a voice mail service (VMS) applied to a designated directory number without connecting the unanswered forwarded communication to the designated directory number, the system comprising:

a service control point operative to:
  receive the designated directory number and a VMS directory number in connection with a call;
  parse the designated directory number as a called party number and the VMS directory number as a redirected number into call instructions;
  provide the call instructions so that the call is routed with and based on the call instructions;
  receive an identification of a network element as a billing party number associated with the call; and
  in response to the identification, direct that the call be terminated to the redirected number and that the redirected number be changed to the designated directory number, so that the call is terminated to the VMS directory number as the redirected number without connecting the unanswered forwarded communication to the designated directory number and the redirected number is changed to the designated directory number.

18. In a telecommunications system having a call forwarding service, a system to enable connection of an unanswered forwarded communication to a voice mail service (VMS) applied to a designated directory number, comprising:

an intelligent peripheral operative to:
  recognize that a communication that has been forwarded has gone unanswered;
  recognize that the communication is to be connected to the VMS;
  place a call by dialing a code followed by voice mail information including the designated directory number and a VMS directory number, so that the call is routed through the telecommunications system based on the code, and so that, in response to the call being dialed to the code, the voice mail information is parsed with the dated directory number as a called party number and the VMS directory number as a redirected number, and so that the call is terminated to the VMS directory number as the redirected number, and with the redirected number thereafter being changed to the designated directory number; and
  after the call has been terminated to the VMS directory number, bridge the communication to the call.

19. A method to connect an unanswered forwarded communication to a voice mail service (VMS) serving a directory number from which the unanswered forwarded communication was forwarded without connecting the communication to the directory number, comprising:

detecting the unanswered forwarded communication;

making a call and including voice mail information with the call so that the call is routed to the VMS serving the directory number, the voice mail information being parsed with the directory number as a called party number and a VMS directory number as a redirected number, and so that the call is terminated to the VMS directory number as the redirected number, and with the redirected number, thereafter being changed to the directory number; and bridging the call with the unanswered forwarded communication.

* * * * *

UNITED STATES PATENT AND TRADEMARK OFFICE
CERTIFICATE OF CORRECTION

PATENT NO. : 6,301,349 B1
DATED : October 9, 2001
INVENTOR(S) : Dale W. Malik

It is certified that error appears in the above-identified patent and that said Letters Patent is hereby corrected as shown below:

Column 15,
Line 52, delete "2." and insert -- 3. --.
Line 52, delete "claim 1.," and insert -- claim 2., --.
Line 64, delete "3." and insert -- 5. --.
Line 64, delete "claim 2.," and insert -- claim 3., --.

Column 16,
Line 5, delete "4." and insert -- 6. --.
Line 5, delete "claim 3," and insert -- claim 5. --.
Line 12, delete "5." and insert -- 2. --.
Line 21, delete "6." and insert -- 4. --.

Column 20,
Line 15, delete "dated" and insert -- designated --.

Signed and Sealed this

Seventeenth Day of June, 2003

JAMES E. ROGAN
*Director of the United States Patent and Trademark Office*